United States Patent
Whear et al.

(10) Patent No.: US 10,923,700 B2
(45) Date of Patent: Feb. 16, 2021

(54) MULTILAYER SEPARATOR AND METHODS OF MANUFACTURE AND USE

(71) Applicant: Daramic, LLC, Charlotte, NC (US)

(72) Inventors: J. Kevin Whear, Utica, KY (US); Eric H. Miller, Philpot, KY (US)

(73) Assignee: Daramic, LLC, Charlotte, NC (US)

( * ) Notice: Subject to any disclaimer, the term of this patent is extended or adjusted under 35 U.S.C. 154(b) by 0 days.

(21) Appl. No.: 16/398,622

(22) Filed: Apr. 30, 2019

(65) Prior Publication Data

US 2019/0260003 A1 Aug. 22, 2019

Related U.S. Application Data

(62) Division of application No. 14/584,109, filed on Dec. 29, 2014, now Pat. No. 10,276,850.

(60) Provisional application No. 61/923,051, filed on Jan. 2, 2014.

(51) Int. Cl.
| | |
|---|---|
| *H01M 2/18* | (2006.01) |
| *H01M 2/16* | (2006.01) |
| *H01M 2/14* | (2006.01) |
| *H01M 10/12* | (2006.01) |

(52) U.S. Cl.
CPC ............. *H01M 2/18* (2013.01); *H01M 2/145* (2013.01); *H01M 2/1653* (2013.01); *H01M 2/1686* (2013.01); *H01M 10/12* (2013.01); *H01M 2220/20* (2013.01); *Y02E 60/10* (2013.01); *Y02P 70/50* (2015.11); *Y10T 29/49108* (2015.01)

(58) Field of Classification Search
None
See application file for complete search history.

(56) References Cited

U.S. PATENT DOCUMENTS

| | | |
|---|---|---|
| 3,917,772 A | 11/1975 | Hollenbeck |
| 3,947,537 A | 3/1976 | Buntinw et al. |
| 4,000,352 A | 12/1976 | Hollenbeck et al. |
| 4,245,013 A | 1/1981 | Clegg et al. |
| 5,221,587 A | 6/1993 | Böhnstedt et al. |
| 5,558,952 A | 9/1996 | Knauer |
| 5,618,642 A | 4/1997 | Sam, II et al. |
| 5,716,734 A | 2/1998 | Nakano |
| 7,977,410 B2 | 7/2011 | Nagamatsu et al. |

(Continued)

FOREIGN PATENT DOCUMENTS

| | | |
|---|---|---|
| CN | 1064969 A | 9/1992 |
| JP | 2013-213212 A | 10/2013 |

(Continued)

OTHER PUBLICATIONS

Besenhard, J.O., Editor, "Chapter 9," Handbook of Battery Materials, Wiley-VCH Verlag GmbH (Weinheim, Germany), (p. 245-292), (1999).

*Primary Examiner* — Sarah A. Slifka
(74) *Attorney, Agent, or Firm* — Hammer & Associates, P.C.

(57) ABSTRACT

A multilayer deep cycle battery separator comprising at least two layers of an automotive-sized separator bonded or welded together. The automotive-sized separator layers include a backweb having a backweb thickness between 6 to 10 mils, an overall thickness of between 25 to 65 mils, and a rib base width of between 20 to 35 mils. The automotive-sized separator layers also have an extraction time of between 45 to 75 seconds, thereby providing an overall extraction time of less than a standard deep cycle battery separator.

13 Claims, 3 Drawing Sheets

(56) References Cited

U.S. PATENT DOCUMENTS

2006/0141350 A1 6/2006 Dreyer et al.
2012/0070714 A1 3/2012 Chambers et al.

FOREIGN PATENT DOCUMENTS

WO    WO 79/01057 A1    12/1979
WO    WO 01/13442    2/2001

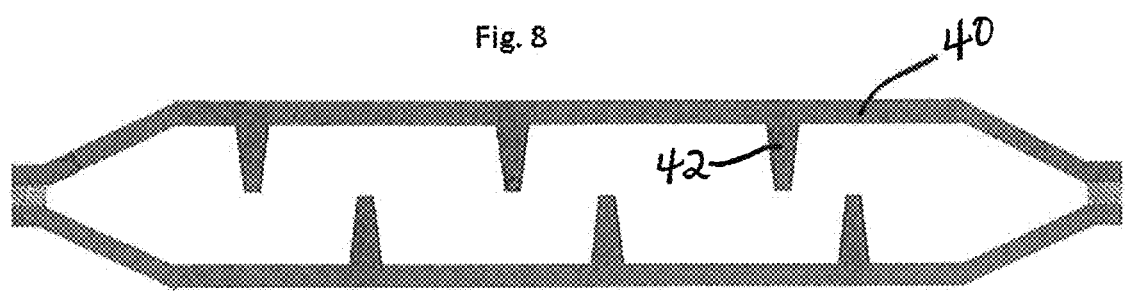
Fig. 8
Fig. 9
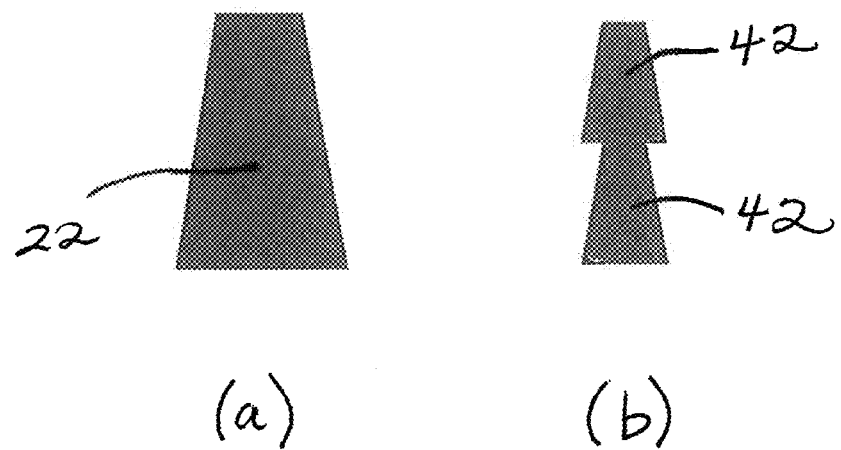
(a)  (b)

MULTILAYER SEPARATOR AND METHODS OF MANUFACTURE AND USE

CROSS-REFERENCE TO RELATED APPLICATION

The instant application is a Divisional of U.S. application Ser. No. 14/584,109, filed Dec. 29, 2014, which claims the benefit of U.S. Provisional Patent Application Ser. No. 61/923,051, filed Jan. 2, 2014, the disclosures of which are incorporated herein by reference.

FIELD OF THE INVENTION

The instant invention is directed to a new, improved or optimized separator for a battery, such as a deep cycling storage battery, and/or related methods. In accordance with at least selected embodiments, the instant invention is directed to a multilayer separator for an industrial storage battery, a deep cycling or deep cycle storage battery, or the like, and/or to methods of manufacture and/or use thereof.

BACKGROUND OF THE INVENTION

A battery separator is used to separate the battery's positive and negative electrodes or plates in order to prevent an electrical short. Such a battery separator is typically microporous so that ions may pass therethrough between the positive and negative electrodes or plates. In lead/acid storage batteries, either automotive batteries or industrial and/or deep cycle batteries, the battery separator is typically a microporous polyethylene separator having a backweb and a plurality of ribs standing on the backweb. See: Besenhard, J.O., Editor, Handbook of Battery Materials, Wiley-VCH Verlag GmbH, Weinheim, Germany (1999), Chapter 9, pp. 245 -292. The separators for automotive batteries are typically made in continuous lengths and rolled, subsequently folded, and sealed along the edges to form pouches or envelopes that receive the electrodes for the batteries. The separators for industrial (or traction or deep cycle storage) batteries are typically cut to a size about the same as an electrode plate (pieces or leaves).

In a typical lead/acid microporous polyethylene battery separator, the separator has a ribbed face (i.e., with the primary ribs) and a back face (i.e., without ribs or a plurality of small or secondary ribs). The negative electrode (or plate) may be placed adjacent to the back face, while the positive electrode (or plate) may rest on the ribs of the ribbed face. U.S. Pat. No. 3,917,772 illustrates a method of making a lead/acid battery separator sheet from a plastic material and is hereby incorporated by reference herein. In this method, the sheet is calender molded to form ribs and/or projections. Referring to FIGS. 2 and 3 of U.S. Pat. No. 3,917,772, ribs 29 and 31 have a solid profile. Referring to FIGS. 4 and 5 of U.S. Pat. No. 3,917,772, discrete projections 45 and 49 are formed by rounded pits in the calendering rolls 12 and 13. U.S. Pat. No. 4,000,352, which is hereby incorporated by reference herein, illustrates a lead/acid battery separator characterized by an interrupted pattern of discrete separator projections standing on a backweb. Each projection has a circular or oval shape. U.S. Pat. No. 5,558,952, which is hereby incorporated by reference herein, illustrates a lead/acid battery separator having a plurality of discrete ribs with no intermediate connecting walls. U.S. Pat. No. 5,716,734, which is also hereby incorporated by reference herein, illustrates a lead/acid battery separator having a plurality of ribs, each with a solid profile. PCT Publication WO 01/13442, which is hereby incorporated by reference herein, illustrates a lead/acid battery separator having at least one vertical rib and a plurality of studs. The studs are truncated cones, and their bases are flush with the backweb. The ribs have a solid profile.

The typical separator for lead/acid batteries is made from polyethylene ("PE") resin. The manufacturing of the PE separator used in lead/acid batteries, like flooded lead acid batteries, may include extruding a mixture of precipitated silica, PE, such as Ultra High Molecular Weight polyethylene (UHMWPE) or some other type of PE, and mineral oil, along with some other minor ingredients into a profile sheet or film. This profile sheet is then solvent extracted where the bulk of the mineral oil is removed or extracted to create porosity in the sheet or film. The last step of the process is often called finishing, where the profile sheet is mechanically adjusted to the desired width, overall thickness and length.

The aforementioned process produces a PE separator that may be used in a variety of applications including automotive, stationary and deep cycling (or traction or industrial) batteries. In general, the automotive separators are thinner in backweb and overall thickness as compared to those separators used in deep cycling and/or industrial batteries. The following table, Table 1, highlights the typical differences in mechanical dimensions of the automotive battery separators versus the deep cycling and/or industrial battery separators.

TABLE 1

|  | Units | Automotive Separator | Deep Cycle Separator |
| --- | --- | --- | --- |
| Backweb |  |  |  |
| Thickness Overall | (mils) | 6 to 10 | 12 to 25 |
| Thickness | (mils) | 12 to 65 | 65 to 140 |
| Rib Base Width | (mils) | 12 to 50 | 35 to 80 |
| Extraction Time | (seconds) | 45 to 75 | 180 to 300 |

To better understand the numbers in Table 1 above, FIG. 1, which shows a typical deep cycle battery separator, also shows backweb 20 having a certain backweb thickness (or height) and rib 22 having a certain rib base width (where rib 22 meets backweb 20). The separator shown in FIG. 1 has an overall thickness that includes the backweb thickness as well as the height of the rib 22 above the backweb.

Because of the structural differences between a typical deep cycle battery separator and a typical automotive battery separator, the deep cycle battery separator usually takes longer to make, for example, it may take approximately 3 to 5 times longer in the extraction process to remove the oil to the proper level than a typical automotive separator. The time in the extraction process is defined by diffusion principles where the oil is removed from the separator. As the deep cycling separator has a thicker backweb thickness and larger ribs, the rate of diffusion of the oil out of the separator is substantially longer than the time required to extract oil out of the automotive separator.

As such, there is a need or desire to produce a deep cycling separator or a separator for a deep cycle storage battery or an industrial or traction battery with the desired backweb thickness and overall thickness as well as rib shape that is useful for a deep cycle battery separator, while also reducing the manufacturing time for such a separator, reducing the extraction time for such a separator and/or simplifying the manufacturing process for such a separator.

SUMMARY OF THE INVENTION

In accordance with various embodiments herein, the instant invention is designed to address at least some of the above mentioned needs or problems, and/or the invention is directed to a multilayer or composite separator for use with a deep cycle storage battery and/or an industrial storage battery. The multilayer separator may comprise at least two layers bonded or welded together, wherein each layer preferably comprises a layer of automotive-sized separator or separator that is typically used in an automotive battery. In certain instances, a layer of automotive-sized separator may comprise a backweb and one or more ribs. In some embodiments, the backweb thickness may range from about 5 to about 10 mils, and in other embodiments, from about 6 mils to about 10 mils. In various embodiments, the overall thickness of the layer of automatize-sized separator, which overall thickness includes the backweb thickness and the height of a rib, may range from about 12 mils to about 65 mils, in some embodiments, about 15 mils to about 65 mils, and in other embodiments, about 25 mils to about 65 mils. Additionally, the base of a rib may have a width of from about 12 to about 50 mils, in some embodiments, about 20 mils to about 35 mils.

The multilayer or composite separator described herein may have an extraction time of from about 45 seconds to about 75 seconds, where such an extraction time refers to the time it takes for oil to be extracted from the separator as pores are being formed.

Each layer of automotive-sized separator may comprise polyethylene, PVC, rubber, a phenolic resin, polypropylene, cellulosic material, and combinations thereof.

In various embodiments, the layers may be welded together by welding techniques selected from the group consisting of: heat; pressure; heat and pressure; sonic welding; vibration; crimping; laser; the like; and/or any combination thereof. In other embodiments, the layers may be connected together by a layer of adhesive. In such embodiments, the adhesive may be selected from the group consisting of: a standard adhesive, latex rubber, coating with the basic solution of sodium silicate that is ultimately neutralized with acid; the like; and/or combinations thereof.

In some aspects of the present invention, the multilayer separator further includes one or more additives. In various instances, such an additive may be selected from the group consisting of: ground rubber; latex rubber; lignin; sodium sulfate; the like; and/or combinations thereof. In various embodiments, the additive or additives are between the layers. In certain instances, the multilayer deep cycle battery separator may include one or more additives pocketed into a welded region of the separator (such as is done in the nonwoven industry as they add super absorbent polymers to incontinence products).

The multilayer separator in some instances may comprise the at least two layers, wherein each layer comprises a layer of automotive-sized separator or separator that is typically used in an automotive battery, wherein the layers are not bonded or welded or otherwise attached to each other using some means of attachment. In such cases, the layers of automotive-sized separator are positioned together by being enveloped, wrapped, sleeved or stacked.

In other embodiments, the layers of automotive-sized separator are embossed together. In these cases, the layers are embossed together by two or more layers being fed through a pair of mated rollers with a three-dimensional pattern, whereby when the two or more layers are embossed, the original shape of the ribs is modified in the pattern of the embossed roller(s). In such cases, the points of connectivity of the embossed layers may be across a portion of the separator or across the entire face of the separator.

The multilayer deep cycle battery separator described herein may comprise two layers of automotive-sized separator, which two layers are connected back to back, meaning the backwebs of the two layers are adjacent each other. In such embodiments, one or both of the layers may comprise a backweb having negative ribs such that the negative ribs are thereby positioned between the backwebs of the two layers. In other embodiments, the layers are stacked on top of one another, wherein the backweb of one layer is stacked atop the top of the rib or ribs of the second layer. In additional embodiments, the layers are positioned in a rib-to-rib fashion. In certain embodiments, the ribs are stacked on top of each other adjacent to each other. In still other embodiments, the ribs of one layer are offset relative to the ribs of the other layer.

In still other embodiments, the multilayer separator comprises a ribbed separator and a flat sheet. In the embodiments described throughout the disclosure, the ribs may be selected from the group consisting of: straight vertical ribs; sinusoidal; diagonal; continuous; discontinuous; embattlement; cross rib patterns; other shapes and/or patterns; the like; and/or combinations thereof.

The multilayer deep cycle battery separator of the invention may have an extraction time that is less than the extraction time for a standard deep cycle battery separator. For instance, the multilayer deep cycle battery separator of the invention may have an extraction time that is at least $2/3$ less than the extraction time for a standard deep cycle battery separator, in other instances, between $2/5$ and $2/3$ less.

Additionally, the multilayer deep cycle battery separator of the invention may have a stiffness greater than the stiffness of a standard deep cycle battery separator. Moreover, the multilayer deep cycle battery separator of the invention may have a compression greater than the compression of a standard deep cycle battery separator. Further, the multilayer deep cycle battery separator of the present invention may have a rib mass that is less than the rib mass of a standard deep cycle battery separator. And the multilayer deep cycle battery separator of the present invention may have fewer pinholes than a standard deep cycle battery separator.

The multilayer deep cycle battery separator may comprise a composite structure, which composite structure may include a stiffening material on one or both outer surfaces and/or between the layers. Such a stiffening material may be selected from the group consisting of: a glass mat; glass fibers; a synthetic mat; synthetic fibers; the like; and combinations thereof.

Various aspects of the present invention include a battery comprising the multilayer deep cycle battery separator described herein. In such embodiments, the battery may be a deep cycle battery, an industrial battery, an ISS battery, and/or the like. And in the manufacture of a battery, the present invention may include the improvement comprising providing to such battery at least one of the multilayer deep cycle battery separators described herein.

The present invention also is directed to a method of separating a battery's positive and negative electrodes including using at least one of the multilayer deep cycle battery separators described and claimed herein. And various methods of manufacturing a deep cycle battery separator are also disclosed herein.

A method of producing a lead acid battery is described, where two layers of separators are used in such a manner to replace a thicker separator, such as two automotive separators used to replace a deep cycle battery separator. In such a method of producing a lead acid battery, the positive electrode is enveloped, wrapped or sleeved with one separator while the negative electrode is enveloped, wrapped or sleeved with another separator.

Moreover, the present invention provides various new or improved batteries, components, separators, systems, their methods of manufacture and/or use, and/or means and/or methods of enhancing the extrusion tooling, minimizing rib calendaring, minimizing rib mass, improving extrusion changeover, reducing pinholes, adding additives, providing a composite structure, providing acid displacement, as shown or described herein.

BRIEF DESCRIPTION OF THE DRAWINGS

FIG. 8 illustrates a cross-sectional view of a multilayer deep cycle battery separator in accordance with still another embodiment of the present invention.

FIG. 9 illustrates a cross-sectional view of a rib portion of a typical, single-layer deep cycle battery separator in FIG. 9(a) compared with a profile in FIG. 9(b) of two rib portions of a multilayer deep cycle battery separator according to various embodiments of the present invention, such as a battery separator in accordance with FIG. 4 shown herein.

DETAILED DESCRIPTION OF THE INVENTION

Figure 1:
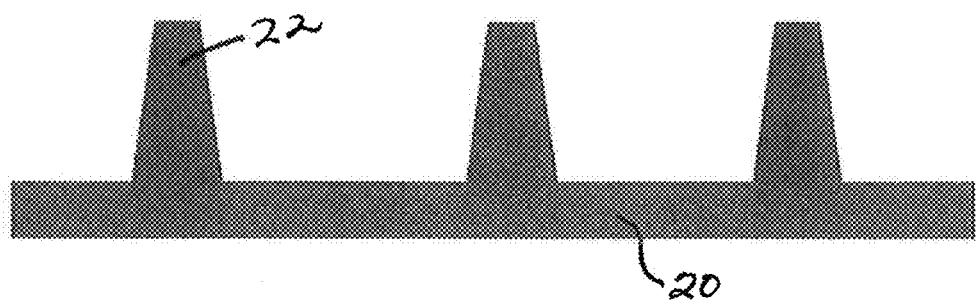
FIG. 1 includes a cross-sectional view of a typical, single-layer deep cycle battery separator.

In accordance with at least selected embodiments, the instant invention addresses the above mentioned needs or problems by providing two or more thinner separators, preferably two or more automotive separators, together to provide a new multilayer separator that may perform the function of the conventional, thicker deep cycle battery separator, to produce a deep cycle battery separator with the required backweb thickness and overall thickness that reduces the manufacturing time, reduces the extraction time, reduces complexity by reducing separator types, and/or simplifies the manufacturing process. The instant invention of two or more automotive separators together can be constructed in such a way to have the same total backweb and overall thickness as the existing deep cycle battery separator and thus provide similar functionality. However from a process and product usage standpoint, two or more automotive separators together can provide many advantages when compared to the existing industrial deep cycling or deep cycle battery separator.

In the embodiments shown and described herein, the deep cycle separator of the instant invention may preferably include two layers of automotive-sized separators. However, the invention is not so limited, and the instant invention may include any number of automotive-sized separators, like two or more multi-layers of automotive sized-separators to provide the desired properties for the deep cycle separator.

Two or more automotive-sized separators may be included in the instant invention of a multilayer deep cycle battery separator. The automotive sized-separators used in the multilayer separator of the instant invention may include, but are not limited to, a backweb thickness of between about 5 to about 10 mils, an overall thickness of between about 15 to about 65 mils, and a rib base width of between about 12 to about 50 mils. In addition, the automotive-sized separators and/or production methods used in or to produce the multilayer separators of the instant invention may include, but are not limited to, having a preferred extraction time of between about 45 to about 75 seconds.

The instant invention contemplates various embodiments of how the two or more layers of automotive-sized separators are together. In one embodiment, the two or more layers of automotive-sized separators may be together by welding. As the PE separator is highly weldable unto itself, it is contemplated that the welding is accomplished by various welding or other similar processes, including, but not limited to, heat, pressure, heat and pressure, sonic welding, vibration, crimping, laser, the like, or any combination thereof.

In other various embodiments, the multilayer structure or separator of the instant invention could be achieved by adding a layer of adhesive between the two layers. In one embodiment, an additive is included with the multilayer separator, and the desired additive may even have adhesive properties. Besides standard adhesives, in other embodiments, the layers may be assembled with latex rubber or via coating with a basic solution of sodium silicate that is ultimately neutralized with acid.

In other select embodiments, to make matters even simpler, a battery manufacturer could use two or more distinct layers of automotive type separators in place of one deep cycling or deep cycle battery separator without any welding or other means of attachment. In the manufacture of batteries, electrodes may be enveloped, wrapped, sleeved, or stacked with the multilayer separators of the instant invention. In one embodiment, the battery manufacturer could simply replace one deep cycle battery separator with two automotive type separators. For instance, instead of just sleeving the positive electrode with a deep cycle battery separator, one could sleeve each one of the positive and negative electrode with an automotive-type separator material.

In other select embodiments, the two or more layers of the deep cycle separator of the instant invention may be embossed together. For example, in this embossed embodiment, the two or more layers may be fed through a pair of mated rollers with a three dimensional pattern. When the two layers may be embossed, the original shape of the ribs may be modified in the pattern of the embossed roll. This embossing step may be an advantageous concept for welding or connecting the two layers together because the points of connectivity may be across the entire face of the separator.

Referring now to the Figures, it is shown that various combinations and orientations of automotive-sized separators are contemplated for various embodiments of the instant invention. However, the instant invention is not so limited, and the Figures are merely provided as examples. In FIG. 1, this diagram shows the prior art, typical standard deep cycle battery separator with a backweb 20 and rib 22 as well as the required relative backweb thickness, overall thickness and rib base width.

Figure 2:
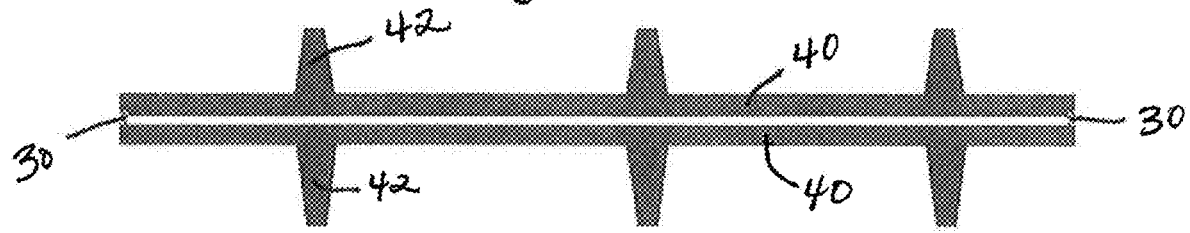
FIG. 2 includes a cross-sectional view of a multilayer deep cycle battery separator in accordance with one embodiment of the present invention.
Figure 3:
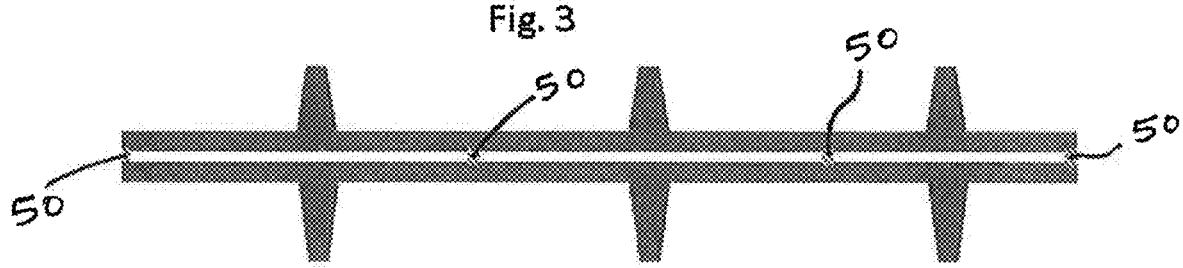
FIG. 3 includes a cross-sectional view of another multilayer deep cycle battery separator in accordance with another embodiment of the present invention.

FIG. 2 shows one embodiment of the instant invention with two layers of automotive-sized separators connected back to back. In such embodiment, each separator or separator layer comprises a backweb 40 and ribs 42, and the two layers or separators are attached via welds 30. This embodiment is also shown in FIG. 3, however, in FIG. 3 the welds 50 are more frequent.

Figure 4:
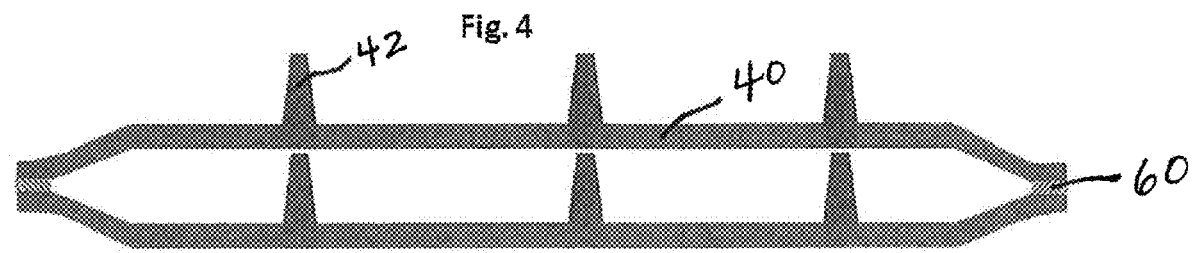
FIG. 4 depicts a cross-sectional view of yet another multilayer deep cycle battery separator in accordance with an embodiment of the present invention.

Referring to FIG. 4, this embodiment may show the most straightforward approach of combining two automotive separators to meet the needs now realized by the deep cycling separator with the separators stacked on top of one another. In such embodiment, each separator or separator layer comprises a backweb 40 and ribs 42, and the two layers or separators are attached via welds 60. In the embodiment shown in FIG. 4, the multilayer deep cycle battery separator may provide improved stiffness when compared to known or existing deep cycle separators (such as, for example, the separator depicted in FIG. 1).

Figure 5:
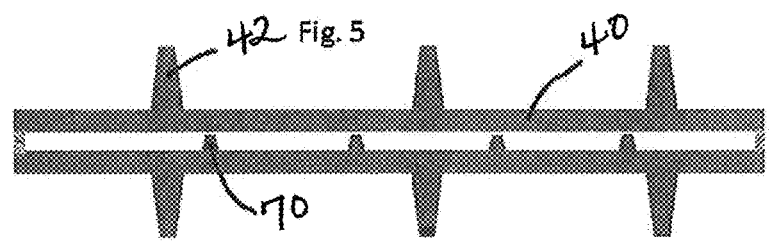
FIG. 5 shows a cross-sectional view of still another multilayer deep cycle battery separator in accordance with one embodiment of the present invention.

Referring to FIG. 5, an embodiment with two layers of automotive-sized separator is shown with the layers back to back and at least one of the layers including negative ribs 70, which are thereby positioned between the two layers. This configuration may offer a separator product with the stiffness maximized or optimized.

Figure 6:
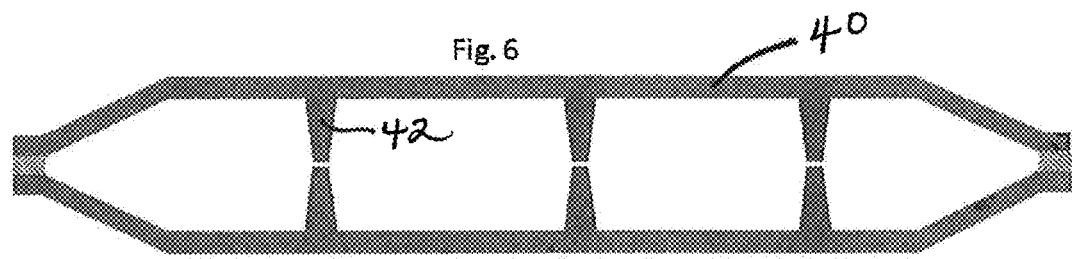
FIG. 6 includes a cross-sectional view of a multilayer deep cycle battery separator in accordance with an embodiment of the present invention.

Referring now to FIG. 6, this diagram shows an embodiment with two layers of automotive-sized separator together rib to rib with the ribs 42 aligned on top of one another. As an example, this embodiment may offer maximum or optimum compression against the active material to prevent shedding.

Figure 7:
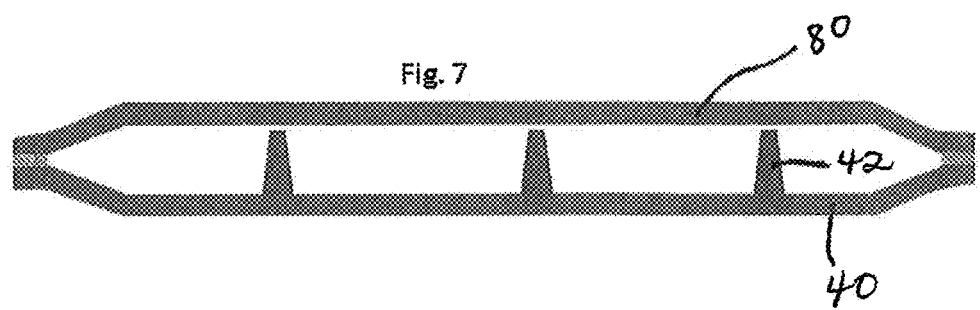
FIG. 7 depicts a cross-sectional view of a multilayer deep cycle battery separator in accordance with yet another embodiment of the present invention.

Referring now to FIG. 7, this figure shows an embodiment with a ribbed separator that includes ribs 42 and backweb 40, together with a flat sheet 80.

In FIG. 8, an embodiment is shown with two layers of automotive-sized separator together in a rib to rib orientation with the ribs 42 offset from one another.

Referring to FIG. 9, a side-by-side comparison of a typical industrial-sized and industrial-shaped rib is shown next to a multi-layer rib with 2 automotive ribs stacked on top of one another. This figure illustrates a cross-sectional view of a rib portion of a typical, single-layer deep cycle battery separator in FIG. 9(*a*) compared with a profile in FIG. 9(*b*) of two rib portions of a multilayer deep cycle battery separator according to various embodiments of the present invention, such as a battery separator in accordance with FIG. 4 shown herein. These ribs 22 and 42 plus 42 are shown with the same height (H) of 50 mils, however, the multi-layer rib with 2 automotive ribs stacked on top of one another has a width that is clearly reduced from the industrial sized and shaped rib. By way of example only, in FIG. 9(*a*), the width of the bottom or base of the rib 22 might be, for instance, about 50 mils, with the top of the rib having a width of about 35 mils. In contrast, and by way of example only, in FIG. 9(*b*), the width of the bottom or base of the bottom rib 42 in the stack might be, for instance, about 30 mils, with the top of the top rib 42 having a width of about 21 mils.

The multilayer deep cycle battery separator may include ribs on one or more of the layers. The ribs may be any ribs, including, but not limited to straight ribs as shown in the Figures. However, the instant invention is not so limited and could also be embodied by not just straight vertical ribs but also by sinusoidal, diagonal, discontinuous, embattlement, cross rib patterns, other shapes and/or patterns, the like, and combinations thereof.

In one embodiment, the multilayer deep cycle battery separator of the instant invention may include layers made from PE separators. However, the invention is not so limited and in other various embodiments could also include separators made from PVC, rubber, phenolic resin, PP, cellulosic materials, other separator materials known or later discovered, the like, and combinations thereof.

One advantage of providing two layers of automotive-sized separator to create the deep cycle separator of the instant invention is reducing the extraction time and simplifying the manufacturing process. For example, the two automotive separators may require approximately 60 seconds each to process through the extraction process or 120 seconds in total. The time to extract the existing deep cycle or industrial battery separator takes approximately 180 to 300 seconds. Thus with regard to extraction time, one can expect to increase the output of the extractor by 1.5 to 2.5 times. Thus, improvement will be seen in utilization of the extraction equipment; however, as discussed below, many other advantages can also be obtained using the separator described herein.

Another advantage to the instant invention may be a reduction in cost and time required for extrusion tooling. Currently the volume of automotive separators is approximately 10 times greater in volume, square meters, than is supplied for deep cycling applications. However to supply the deep cycling industry, there are often as many unique profile rolls or ribbing designs needed. Thus the expense of constructing and maintaining calendar rolls is similar for deep cycling applications as it is for automotive applications even though the market volume is approximately 1/10 the size in terms of square meters. The proposed invention offers the potential to suppress the expense associated with the deep cycling calendar rolls and simply utilize the product produced from the automotive calendar rolls or combinations of products.

Yet another advantage to the instant invention may be to minimize rib calendaring. To suppress cost associated with calendar rolls, often one calendar roll will be used to make products with varying rib height or overall thickness. As the degree of rib filling may be relatively constant in the extrusion process, the rib can be calendared anywhere from 1 to 25 mils. This feature may increase the range of products in varying overall thicknesses that can be supplied while minimizing the added costs of calendar rolls. So when a product is calendared 25 mils, there is extra mass that is being wasted. Therefore with the present invention, the calendared rib mass can be saved simply by selecting appropriate combinations of automotive profiles that allow for minimum calendaring.

Yet another advantage of the instant invention may be to minimize rib mass. Besides minimizing rib mass by limiting the range of calendaring there is another aspect for decreasing the mass associated with the ribs. In order to prevent ribs from leaning with the manufacturing process or once inside the battery, it has been found that the base of the rib needs to be proportional to the height of the rib. Thus a taller rib will have a wider base in comparison to a shorter rib with a narrower base. In the present invention, two smaller ribs are used to achieve the overall separator thickness instead of one tall rib as the ribs are placed on opposite sides of the separator from one another. In this configuration, the mass of two small ribs will provide the same spacing as one big rib but with less mass required.

Yet another advantage of the instant invention may be with regards to extrusion changeover. If the deep cycling separator is replaced with two automotive separators together, the need to stop the extrusion process and install the appropriate deep cycle profile roll will be eliminated. As mentioned earlier, the deep cycle separators are approximately 1/10 the volume of the automotive product but with approximately the same number of ribbing configurations or required calendar rolls. Due to the lower volume of deep cycle separators, the profile tooling often only runs 8 to 24 hours in an extruder where an automotive tooling, due to the volume demand, may run in excess of 100 hours. Thus replacing the deep cycle separators with two automotive separators will eliminate the need to make frequent tooling changeovers and decrease the material scrap.

Yet another advantage of the instant invention may be the reduction of undesired pinholes. As PE separators are produced, pinholes are occasionally encountered in the material and to such a level that an entire roll will need to be scrapped. By definition, a pinhole can be as small as 100 microns in diameter opening. As two layers are laminated together, the frequency of observed or detected pinholes will decrease substantially. With two layers laminated together, any associated pinholes will have to occur in both layers in the same location and this is highly unlikely.

Yet another advantage of the instant invention may be the option for additives. To meet the needs of the deep cycling market, additives are often contained in separators provided into this market. These additives are often incorporated in the extrusion process facility, which creates the need to purge the extrudate going on and off the particular formula. By combining two layers, one could imagine incorporating the various additives (or more electrolyte) between the layers and then pocketing them into a welded region such as is done in the nonwoven industry as they add super absorbent polymers to incontinence products. Again this may have the effect of standardizing the extrusion and extraction process and then introducing the uniqueness at the last step of the manufacturing process. Examples of additives helpful to the battery and the battery separator could be, but are not limited to, ground rubber, latex rubber, various lignins or compounds like sodium sulfate, other desired additives known or later discovered, the like, and combinations thereof.

Yet another advantage of the instant invention may be the option to provide a composite structure. Often deep cycle separators are assembled by hand and stiffness is a desirable property. To enhance stiffness, it is contemplated to add between the layers material to stiffen the structure, including, but not limited to, a glass mat, glass fibers, a synthetic mat, synthetic fibers, other desired materials known or later discovered, the like, and combinations thereof.

Yet another advantage of the instant invention may relate to acid displacement. Deep cycling batteries, such as batteries that provide energy for an electric forktruck, golf cart, mining vehicles, etc., are often home power supplied and are regularly discharged deeply before recharging. As the electrolyte, sulfuric acid, is a reactant in the discharge reaction, batteries that have more electrolyte volume can often have deeper discharges and delivery of more energy to the user. Thus far, this disclosure has spoken of reducing the rib mass and ultimately the separator mass by two automotive separators together when compared to the existing deep cycle separator. Thus, with less separator mass, the two automotive separators together will allow for more acid between the electrodes thereby creating a situation where more energy can be delivered to the user, assuming the battery is acid limited by design.

The present invention may be embodied in other forms without departing from the spirit and the essential attributes thereof, and, accordingly, reference should be made to the appended claims, rather than to the foregoing specification, as indicating the scope of the invention. Additionally, the invention illustratively disclosed herein suitably may be practiced in the absence of any element which is not specifically disclosed herein.

The invention claimed is:

1. A deep cycle battery separator comprising
    a multilayer separator characterized by a first separator layer and a second separator layer adjacent to one another; and
    the first separator layer comprising polyethylene (PE) or polypropylene (PP), and the second separator layer comprising polyethylene (PE) or polypropylene (PP), wherein said first separator layer and said second separator layer are in intimate contact with one another.

2. The deep cycle battery separator of claim 1, wherein said first separator layer and said second separator layer are bonded to one another.

3. The deep cycle battery separator of claim 2, wherein said first separator layer and said second separator layer bonded to one another by techniques selected from the group consisting of: heat; pressure; heat and pressure; sonic welding; vibration; crimping; laser; and combinations thereof.

4. The deep cycle battery separator of claim 2, further comprising an adhesive layer disposed between said first separator layer and said second separator layer.

5. The deep cycle battery separator of claim 4 wherein said adhesive is selected from the group consisting of: a standard adhesive; latex rubber; a coating with a basic solution of sodium silicate that is ultimately neutralized with acid; and combinations thereof.

6. The deep cycle battery separator of claim 2, wherein said first separator layer and said second separator layer form a pocket.

7. The deep cycle battery separator of claim 1 wherein each of said first separator layer and said second separator layer comprise:
    a backweb having a backweb thickness of between 5 and 10 mils,
    an overall thickness of between 25 and 65 mils, and
    a rib having a rib base width of between 12 and 50-mils.

8. The deep cycle battery separator of claim 1 wherein at least one of said first separator layer and said second separator layer comprise PE.

9. The deep cycle battery separator of claim 8 wherein each of said first separator layer and said second separator layer comprise PE.

10. The deep cycle battery separator of claim 1, wherein one or both of said first separator layer and said second separator layer comprise one or more additives selected from the group consisting of: ground rubber; latex rubber; one or more lignins; sodium sulfate; and combinations thereof.

11. The deep cycle battery separator of claim 1, further comprising one from the group consisting of: a glass mat; glass fibers; a synthetic mat; synthetic fibers; and combinations thereof.

12. A deep cycle battery comprising the deep cycle battery separator of claim 1.

13. A vehicle comprising the deep cycle battery of claim claim 12.

* * * * *